(12) United States Patent
Oles et al.

(10) Patent No.: US 7,964,244 B2
(45) Date of Patent: Jun. 21, 2011

(54) METHOD FOR PRODUCING A SURFACTANT-FREE SUSPENSION BASED ON NANOSTRUCTURED, HYDROPHOBIC PARTICLES, AND USE OF THE SAME

(75) Inventors: Markus Oles, Hattingen (DE); Edwin Nun, Billerbeck (DE); Bernhard Schleich, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 1091 days.

(21) Appl. No.: 10/518,533

(22) PCT Filed: May 28, 2003

(86) PCT No.: PCT/EP03/05610
§ 371 (c)(1),
(2), (4) Date: Dec. 30, 2004

(87) PCT Pub. No.: WO2004/007625
PCT Pub. Date: Jan. 22, 2004

(65) Prior Publication Data
US 2005/0205830 A1 Sep. 22, 2005

(30) Foreign Application Priority Data
Jul. 13, 2002 (DE) .................................. 102 31 757

(51) Int. Cl.
*B05D 3/02* (2006.01)
(52) U.S. Cl. ..................... 427/384; 427/388.4; 252/8.62
(58) Field of Classification Search ................ 427/430.1, 427/384, 388.4; 252/8.62
See application file for complete search history.

(56) References Cited

U.S. PATENT DOCUMENTS

| | | | |
|---|---|---|---|
| 3,781,258 A * | 12/1973 | Kometani et al. ............. 528/499 |
| 4,664,697 A | 5/1987 | Kaufmann, Jr. |
| 5,118,528 A * | 6/1992 | Fessi et al. ................ 427/213.36 |
| 5,122,518 A * | 6/1992 | Vrba ................................ 514/63 |
| 5,392,559 A * | 2/1995 | Long ................................ 43/121 |
| 5,766,635 A * | 6/1998 | Spenleuhauer et al. ....... 424/489 |
| 6,156,327 A * | 12/2000 | Sekutowski et al. .......... 424/405 |
| 6,235,683 B1 * | 5/2001 | Glenn et al. ................... 504/119 |
| 6,811,856 B2 | 11/2004 | Nun et al. |
| 6,852,389 B2 | 2/2005 | Nun et al. |
| 6,858,284 B2 | 2/2005 | Nun et al. |
| 7,083,828 B2 | 8/2006 | Muller et al. |
| 7,235,298 B2 | 6/2007 | Katusic et al. |
| 7,374,743 B2 | 5/2008 | Katusic et al. |
| 2002/0084553 A1 | 7/2002 | Nun et al. |
| 2002/0148601 A1 | 10/2002 | Roos et al. |
| 2002/0150723 A1 | 10/2002 | Oles et al. |
| 2002/0164443 A1 | 11/2002 | Oles et al. |
| 2002/0192385 A1 | 12/2002 | Jenkner et al. |
| 2003/0013795 A1 | 1/2003 | Nun et al. |
| 2003/0049396 A1 | 3/2003 | Oles et al. |
| 2003/0108716 A1 | 6/2003 | Nun et al. |
| 2003/0124301 A1 | 7/2003 | Oles et al. |
| 2003/0134086 A1 | 7/2003 | Nun et al. |
| 2003/0147932 A1 | 8/2003 | Nun et al. |
| 2004/0154106 A1 | 8/2004 | Oles et al. |
| 2005/0118911 A1 | 6/2005 | Oles et al. |
| 2006/0235143 A1 | 10/2006 | Muller et al. |
| 2007/0254178 A1 | 11/2007 | Nun |
| 2008/0084686 A1 | 4/2008 | Gutsch et al. |
| 2008/0206174 A1 | 8/2008 | Bergandt et al. |

FOREIGN PATENT DOCUMENTS
WO 02 16526 2/2002

OTHER PUBLICATIONS

U.S. Appl. No. 11/312,557, filed Dec. 21, 2005, Oles, et al.
U.S. Appl. No. 11/321,285, filed Dec. 21, 2005, Oles, et al.
U.S. Appl. No. 11/312,340, filed Dec. 21, 2005, Hennige, et al.
U.S. Appl. No. 11/312,469, filed Dec. 21, 2005, Nun, et al.
U.S. Appl. No. 10/526,559, filed Mar. 4, 2005, Nun, et al.
U.S. Appl. No. 10/527,641, filed Mar. 14, 2005, Nun, et al.
U.S. Appl. No. 09/241,077, filed Feb. 1, 1999, Peters, et al.
U.S. Appl. No. 09/692,428, filed Oct. 20, 2000.
U.S. Appl. No. 10/069,562, filed Feb. 27, 2002, Ottersbach et al.
U.S. Appl. No. 10/111,407, filed May 6, 2002, Oles et al.
U.S. Appl. No. 10/501,924, filed Jul. 28, 2004, Nun et al.
U.S. Appl. No. 10/502,804, filed Feb. 8, 2005, Oles et al.
U.S. Appl. No. 10/506,995, filed Sep. 9, 2004, Nun et al.
U.S. Appl. No. 10/506,238, filed Sep. 8, 2004, Nun et al.
U.S. Appl. No. 10/506,604, filed Sep. 10, 2004, Nun et al.
U.S. Appl. No. 10/506,993, filed Sep. 9, 2004, Nun et al.
U.S. Appl. No. 10/506,994, filed Sep. 9, 2004, Nun et al.
U.S. Appl. No. 10/506,236, filed Sep. 8, 2004, Oles et al.
U.S. Appl. No. 10/519,951, filed Dec. 29, 2004, Oles et al.
U.S. Appl. No. 10/551,841, filed Oct. 3, 2005, Nun, et al.
U.S. Appl. No. 10/556,092, filed Nov. 9, 2005, Oles, et al.
U.S. Appl. No. 10/546,979, filed Aug. 26, 2005, Nun, et al.
U.S. Appl. No. 12/159,103, filed Jun. 25, 2008, Nun, et al.
U.S. Appl. No. 12/037,431, filed Feb. 26, 2008, Bergandt, et al.
U.S. Appl. No. 12/300,054, filed Nov. 7, 2008, Bergandt, et al.

* cited by examiner

*Primary Examiner* — Michael Barr
*Assistant Examiner* — Robert S Walters, Jr.
(74) *Attorney, Agent, or Firm* — Oblon, Spivak, McClelland, Maier & Neustadt, L.L.P.

(57) ABSTRACT

The present invention describes a process for preparing a surfactant-free suspension including hydrophobic particles and at least 50.01% by weight of water, where hydrophobic, nanostructured particles are suspended in at least one organic solvent miscible with water and having a boiling point below 150° C., and then this concentrated organic suspension is intensively and thoroughly mixed with surfactant-free water.

14 Claims, No Drawings

METHOD FOR PRODUCING A SURFACTANT-FREE SUSPENSION BASED ON NANOSTRUCTURED, HYDROPHOBIC PARTICLES, AND USE OF THE SAME

The present invention relates to a process for preparing a surfactant-free suspension including hydrophobic particles and at least 50.01% by weight of water, where hydrophobic, nanostructured particles are suspended in at least one organic solvent miscible with water and having a boiling point below 150° C., and then this concentrated organic suspension is intensively and thoroughly mixed with surfactant-free water.

Suspensions of hydrophobic, nanostructured particles are used in the production of dirt- and water-repellant coatings on articles. In the coating process here, hydrophobic particles are applied to the surface of the articles, and thus a surface structure with elevations is produced on the surface of the articles, having dirt- and water-repellant properties.

The principle of self-cleaning coatings is well known. To achieve good self-cleaning of a surface, the surface has not only to be very hydrophobic but must also have some degree of roughness. A suitable combination of structure and hydrophobic properties permits even small amounts of water moving on the surface to entrain adherent dirt particles and clean the surface (WO 96/04123, U.S. Pat. No. 3,354,022).

The prior art of EP 0 933 388 requires an aspect ratio >1 and a surface energy of less than 20 mN/m for these self-cleaning surfaces, the aspect ratio being defined here as the quotient which is the ratio of the average height of the structure to its average width. The abovementioned criteria are to be found in the natural world, for example on the surface of the lotus leaf. The surface of the plant, formed from a hydrophobic waxy material, has elevations separated by up to a few µm. Water droplets essentially contact only these peaks. There are many descriptions in the literature of water-repellant surfaces of this type.

Swiss patent 268 258 describes a process which generates structured surfaces by applying powders, such as kaolin, talc, clay, or silica gel. Oils and resins based on organosilicon compounds are used (examples 1 to 6) to secure the powders to the surface.

EP 0 909 747 describes a process for generating a self-cleaning surface. The surface has hydrophobic elevations whose height is from 5 to 200 µm. A surface of this type is produced by applying a dispersion of pulverulent particles and of an inert material in a siloxane solution, and then curing. The structure-forming particles are secured to the substrate by way of an auxiliary medium.

WO 00/58410 concludes that it is technically possible to render the surfaces of articles artificially self-cleaning. The surface structures necessary for this purpose, made from elevations and depressions, have a separation in the range from 0.1 to 200 µm between the elevations of these surface structures, and have an elevation height in the range from 0.1 to 100 µm. The materials used for this purpose have to be composed of hydrophobic polymers or of lastingly hydrophobicized material. Release of the particles from the carrier matrix has to be prevented.

The use of hydrophobic materials, such as perfluorinated polymers, to produce hydrophobic surfaces is known. A further development of these surfaces consists in structuring the surfaces in the µm to nm range. U.S. Pat. No. 5,599,489 discloses a process in which a surface can be rendered particularly repellant by bombardment with particles of appropriate size, followed by perfluorination. H. Saito et al. in "Surface Coatings International" 4 (1997), 178 et seq., describe another process, in which particles made from fluoropolymers are applied to metal surfaces, giving the surfaces thus generated markedly lower wettability with respect to water, with considerably reduced tendency toward icing.

The principle of self-cleaning surfaces has been borrowed from the natural world. Small contact surfaces lower the level of van der Waals interaction responsible for adhesion to flat surfaces with low surface energy. For example, the leaves of the lotus plant have elevations made from a wax, and these reduce the area of contact with water.

Processes for producing these structured surfaces are likewise known. Besides the use of a master structure to mold these structures in full detail by injection molding or embossing processes, there are also known processes which utilize the application of particles to a surface (DE 100 22 246 A1).

JP 07328532 A describes a water-repellant film which comprises particles whose diameter is from 1 nm to 1 mm. The process described first applies a coating, and then the hydrophobic particles, e.g. AEROSIL®, are applied. It is important here that the coating is present in uncured or only partially cured form. Once the coating has been cured, the superfluous particles are moved.

BASF describes, in DE 100 49 338, a microstructured, self-cleaning catalytically active surface, and also a process for its production. This has the advantage that the catalytically active material has been very substantially protected from poisoning within the depressions, so that the overall surface remains catalytically active. This method can be used to produce heterogeneous catalysts, and when these are used it becomes unnecessary to rid the product stream of undesirable particles which deactivate the catalyst.

Attempts have also recently been made to provide self-cleaning surfaces on textiles. An example of a method found for generating self-cleaning surfaces is the application of hydrophobic, fumed silicas on textiles. Here, the hydrophobic, fumed silicas are bonded into the polymer matrix of the textile fiber during exposure to a solvent.

DE 101 18 348 describes polymer fibers with self-cleaning surfaces. In these, the self-cleaning surface is obtained by
  exposure to a solvent which comprises structure-forming particles,
  using the solvent to solvate the surface of the polymer fibers,
  adhesion of the structure-forming particles to the solvated surface, and
  removing the solvent.

A disadvantage of this process is that during processing of the polymer fibers (spinning, knitting, etc.) the structure-forming particles, and therefore the structure which renders the surface self-cleaning, can become damaged or sometimes even be lost entirely, the result being that the self-cleaning effect is likewise lost. Another disadvantage is the use of solvents. High apparatus costs and safety-engineering cost have to be met here, for reasons associated with the environment.

DE 101 18 346 describes textile sheets with self-cleaning and water-repellent surface, composed of at least one synthetic and/or natural textile base material A, and of an artificial, at least to some extent hydrophobic surface with elevations and depressions made from particles which have been securely bonded to the base material A without adhesives, resins, or coatings. These are obtained by treating the base material A with at least one solvent which comprises the undissolved particles, and removing the solvent, whereupon at least some of the particles become securely bonded to the surface of the base material A. However, the disadvantage of this process is very complicated finishing of the textile surfaces. This process requires precise matching of the solvent to the base material of the textiles. However, in clothing there are generally mixed fabrics present, and this matching therefore becomes more complicated. If the matching of the solvents is not precise, the result can be irreparable damage to parts of the clothing. The surfaces therefore have to be treated prior to tailoring.

All of these coatings have the disadvantage that they are applied permanently to the articles and can therefore not be simply removed and reapplied in the event of impairment by scratching or discoloration or any other damage to the surface or surface structure. If this type of damage occurs, the article either has to be freed from the surface structure by a complicated method and retreated, or has to be disposed of.

WO 00/58410 describes a process for producing detachable coatings with dirt- and water-repellent properties, these being produced by spray-application of hydrophobic alcohols, such as nonacosan-10-ol, or of alkanediols, such as nonacosane-5,10-diol, or of waxes. These coatings can be removed from the articles by strong mechanical forces, e.g. scratching, brushing, or high-pressure water treatment, or by treatment with water which comprises detergents, which disperse some of the structure-formers. A disadvantage here is the strong forces needed for mechanical removal of the coating, always creating a risk that when the coating is removed the article itself will also be damaged. Treatment with water which comprises detergents can likewise lead to damage to the article, depending on its nature.

DE 101 35 157 describes a process for the coating of textiles during a dry cleaning procedure, in which structure-forming particles are added to the cleaning agent. The cleaning agents proposed comprise organic solvents which are relatively hazardous to health, e.g. trichloroethylene, and the use of these leads to mechanical anchoring of the particles to the structure of the textiles. Operation other than in closed-circuit systems may be legal in some countries but is hazardous to the environment.

DE 28 44 052 describes a process for preparing inverse aqueous dispersions of a hydrophobic silica. This process mixes the hydrophobic silica and the water intensively and intimately, where appropriate with addition of a wetting agent. The result is what is known as "dry water", in which very fine water droplets have been encapsulated by a layer of silica. According to the examples presented, the resultant dispersion is pasty to free-flowing.

These pasty dispersions or free-flowing mixtures are unsuitable for use in producing self-cleaning surfaces. WO 00/58410 therefore uses suspensions of hydrophobic particles exclusively based on organic solvents for producing self-cleaning surfaces. As the self-cleaning surfaces are formed, relatively large amounts of organic solvents therefore escape.

It was therefore an object of the present invention to provide a process for producing water-based, surfactant-free suspensions of hydrophobic, nanostructured particles for the production of dirt- and water-repellant coatings on articles. This coating is intended to be relatively stable, even when the articles are made from sensitive materials. The dirt- and water-repellent coating is moreover intended to be detachable using simple means, i.e. without the use of organic solvents or of strong mechanical forces, such as scouring or scrubbing. The suspension of the hydrophobic, nanostructured particles is intended to be very substantially water-based, in order to minimize the content of organic solvent escaping into the environment.

Surprisingly, it has been found that an aqueous, surfactant-free suspension of hydrophobic, nanostructured particles can be prepared by first suspending the hydrophobic, nanostructured particles in an organic solvent or in a solvent mixture, and then mixing this concentrated suspension of particles intensively with surfactant-free water. Applying this aqueous, surfactant-free suspension to the surface of an article and then removing the suspension medium can give coatings with dirt- and water-repellant properties, which are relatively stable when exposed to rain or water spray, but can be removed by simple means. A particularly surprising fact is that it is possible to produce homogeneous, surfactant-free suspensions of extremely hydrophobic particles in a water-based suspension medium, and that these suspensions can be used to generate hydrophobic, nanostructured surfaces.

The present invention therefore provides a process for preparing a surfactant-free suspension including hydrophobic particles and at least 50.01% by weight of water, where hydrophobic, nanostructured particles are suspended in at least one organic solvent miscible with water and having a boiling point below 150° C., and then this concentrated organic suspension is intensively and thoroughly mixed with surfactant-free water.

The invention also provides aqueous suspensions, and the use of these for producing detachable, dirt- and water-repellant coatings on articles. The invention also provides a process for producing a detachable, dirt- and water-repellant coating on articles. During the coating process, hydrophobic particles are applied to the surface of the articles and thus a surface structure with elevations is produced on the surface of the articles, and has dirt- and water-repellant properties, and comprises applying, to at least one surface, a suspension, and then removing the suspension medium.

The present invention also provides articles which have, on at least one surface, a water- and dirt-repellant coating.

The present invention also provides a protective coating, and also an impregnating sprayer which comprises a suspension of the invention.

The present invention describes a process for preparing water-based surfactant-free suspensions of hydrophobic, nanostructured particles, which can be used for producing detachable, dirt- and water-repellant coatings.

The invention has the advantage that a simple method can be used to equip articles with a non-permanent dirt- and water-repellant layer, the only factor determining the selection of the articles which can be equipped with this coating being compatibility with, and wettability by, the predominantly aqueous suspension medium. Unlike the processes of the prior art, the inventive coating with a detachable, dirt- and water-repellant layer is relatively non-injurious to the environment and to health, since only water and small amounts of organic solvent, these being used as suspension medium, are released when this coating is applied. Another advantage of this coating process using the suspension of the invention is the detachment of the coating by water at slightly elevated pressure, and this can take place without the use of detergents.

The coating produced by the process of the invention is non-permanent and is therefore particularly well suited to be a coating which protects new articles and products from contamination, e.g. during transport or in spaces used for sales or presentations. The protective coatings of the invention can be detached without difficulty via exposure to liquid droplets at an elevated pressure.

A feature of the process of the invention for preparing a surfactant-free suspension which comprises hydrophobic particles and at least 50.01% by weight, preferably at least 60.00% by weight, and particularly preferably at least 80.00% by weight, of water, is that hydrophobic, nanostructured particles are suspended in at least one organic solvent miscible with water and having a boiling point below 150° C., and then this concentrated organic suspension is intensively and thoroughly mixed with surfactant-free water.

In the first step of the process of the invention, hydrophobic, nanostructured particles are suspended in at least one organic solvent. The organic solvent used is water-miscible and has a boiling point below 150° C., preferably below 120° C., particularly preferably below 100° C. The organic solvent used preferably comprises acetone, tetrahydrofuran, or an alcohol which is liquid at room temperature, in particular methanol, ethanol, n-propanol, or isopropanol. The alcohol used very particularly preferably comprises ethanol. However, it can also be advantageous for the suspension of the invention to comprise a mixture of these organic solvents.

The particles used in the process of the invention may comprise at least one material selected from minerals, aluminum oxide, silicates, hydrophobicized silicas, metal oxides, mixed oxides, metal powders, pigments, and polymers. The particles may particularly preferably be silicates, doped silicates, minerals, metal oxides, aluminum oxide, precipitated silicas, or fumed silicas (Aerosils®), or pulverulent polymers, e.g. spray-dried and agglomerated emulsions, or cryogenically ground PTFE. The hydrophobic particles used particularly preferably comprise silicas.

The average diameter of the particles used in the process of the invention is preferably from 0.01 to 100 µm, particularly preferably from 0.02 to 50 µm, and very particularly preferably from 0.05 to 30 µm. However, other particles which are suitable are those which under dry conditions, starting from primary particles, combine to give agglomerates or aggregates with sizes from 0.2 to 100 µm.

It can be advantageous for the particles used in the process of the invention to have a structured surface. Preference is given to the use of particles which have an irregular surface nanostructure, i.e. in the range from 1 to 1000 nm, preferably from 2 to 750 nm, and very particularly preferably from 10 to 100 nm. A fine structure means structures whose heights, widths, and separations are within the ranges mentioned. These nanostructured particles preferably comprise at least one compound selected from fumed silica, precipitated silicas, aluminum oxide, silicon dioxide, titanium dioxide, zirconium dioxide, and pulverulent polymers.

The hydrophobic properties of the particles used in the process of the invention may be inherently present through the materials used for the particles, as is the case, for example, with polytetrafluoroethylene (PTFE). However, it is also possible to use hydrophobic particles which have hydrophobic properties after suitable treatment, e.g. particles treated with at least one compound selected from the group consisting of the alkylsilanes, the fluoroalkylsilanes, and the disilazanes. Particularly suitable particles are hydrophobicized fumed silicas, known as Aerosils®. Examples of hydrophobic particles are Aerosil® VPR 411, Aerosil® VP LE 8241 and Aerosil® R 8200. Examples of particles hydrophobicized by treatment with perfluoroalkylsilane followed by heat-conditioning are Aeroperl 90/30®, Sipemat silica 350®, aluminum oxide C®, zirconium silicate, and vanadium-doped, or Aeroperl P 25/20®.

In the process of the invention, the hydrophobic, nanostructured particles are suspended homogeneously in an organic solvent or in a mixture thereof. For this, use is preferably made of from 0.01 to 10.00% by weight, with preference from 0.05 to 5.00% by weight, and very particularly preferably from 0.10 to 2.50% by weight, of hydrophobic particles based on the inventive suspension to be prepared. The amount of organic solvent used for this purpose is preferably from 0.10 to 49.98% by weight of the inventive suspension to be prepared, but particularly preferably from 0.50 to 49.98% by weight, and very particularly preferably from 4.00 to 49.98% by weight.

The highly concentrated suspension of the hydrophobic, nanostructured particles in an organic solvent or in an organic solvent mixture is then intensively and thoroughly mixed with surfactant-free water, in a further step of the process of the invention. In one preferred embodiment of the process of the invention, the organic suspension of the hydrophobic, nanostructured particles is added, by means of a metering apparatus, into a mixing chamber in which it is vigorously and thoroughly mixed with the surfactant-free water, which forms an initial charge. In another embodiment of the process of the invention, the surfactant-free water is added, by means of a metering apparatus, into a mixing chamber in which it is vigorously and thoroughly mixed with the organic suspension of the hydrophobic, nanostructured particles, which forms an initial charge.

The water used in the process of the invention is preferably demineralized water, but particularly preferably distilled water. To break down any agglomerates present it is advantageous to suspend the hydrophobic particles by introducing high levels of shear energy, for example by means of a dissolver disc. It can also be advantageous to use internals which increase turbulence, for example baffles or other obstructions which avoid any formation of standing waves. The Reynolds number is preferably above 2320. The Richardson number calculates the ratio between the magnitude of thermal stratification and of the magnitude of shear in a flow. It is therefore a number which measures the ratio of the variables responsible for the spread or decay of turbulence. The Richardson number relates to a local gradient at one point in the flow, and for the process of the invention the Richardson number is not more than 0.25. An example of a definition of the Richardson number is found in H. Kobus (lecture script "Gewässerhydraulik" [Hydraulics of natural water systems] Lehrstuhl für Hydraulik und Grundwasser, Institut für Wasserbau [Department of Hydrogeology, Institute of Hydraulic Engineering], Stuttgart University).

The aqueous suspension of the invention may be prepared by the process of the invention, and preferably comprises from 0.01 to 10.00% by weight, with preference from 0.05 to 5.00% by weight, and very particularly preferably from 0.10 to 2.50% by weight, of hydrophobic, nanostructured particles. The suspension of the invention comprises from 0.10 to 49.98% by weight, particularly preferably from 0.50 to 49.98% by weight, and very particularly preferably from 4.00 to 49.98% by weight, of organic solvent, based on the inventive suspension to be prepared. The organic solvent used preferably comprises acetone, tetrahydrofuran, or an alcohol which is liquid at room temperature, in particular methanol, ethanol, n-propanol, or isopropanol. The alcohol used particularly preferably comprises ethanol. However, it can also be advantageous for the suspension of the invention to comprise a mixture of these organic solvents. The suspension of the invention comprises at least 50.01% by weight, preferably 60.00% by weight, and particularly preferably 80.00% by weight, of water.

The shelf life of the suspension of the invention becomes longer as the content of organic solvent increases. However, shaking prior to use of the suspension of the invention is always advisable. Since no agglomeration of the particles occurs, the shaking is sufficient to ensure renewed homogeneous distribution of the particles in the suspension of the invention.

The suspension of the invention may be used for producing detachable, dirt- and water-repellant coatings on articles.

Another process of the invention describes the production of a detachable, dirt- and water-repellant coating on articles, where, during the coating process, hydrophobic particles are applied to the surface of the articles and thus a surface structure with elevations is produced on the surface of the articles, and has dirt- and water-repellant properties, where a suspension of the invention is applied to at least one surface of an article, and the suspension medium is then removed.

The suspension may be applied to at least one surface of an article in a manner known to the skilled worker. The suspension of the invention is preferably applied by dipping the article into the suspension of the invention, and then permitting the material to run off, or by spray-application of the suspension of the invention to the article. Surprisingly, spray-application of the suspension can in particular generate especially durable coatings which have relatively low susceptibility to scratching and to abrasion, in particular on polymer surfaces. A possible reason for this is that a material such as alcohol in water facilitates charge equilibration on polymer surfaces, and thus reduces the level of local electrical fields. As a result of this reduction, the particles find it easier to anchor into the surface roughness which is always present. In the spraying procedure, the particles become even more securely embedded into the surface roughness present on the polymer matrix, due to their kinetic energy. The spray-application of the suspension of the invention preferably uses a spray apparatus which has a nozzle of diameter from 0.05 to 2 mm, preferably of diameter from 0.1 to 0.9 mm. It can be advantageous for the Manning coefficient in the tubes of the spray apparatus to assume values below 100. According to Garbrecht (see tu-harburg.de/www/vorlesung-/Script-HydromechWS01-5-6.pdf on the worldwide web), the Manning coefficient can be derived as follows from the wall roughness k:

$$\text{Manning coefficient} = 26/k^{1/6}.$$

In one particular embodiment, the suspension of the invention is applied by means of a sprayer. Containers which may be used are propellant-charged pressure containers or "pumpspray bottles", which can be used without adding propellants and without damaging the environment.

The suspension medium for the suspension of the invention is a mixture of water and organic solvent and is advantageously removed by evaporation or volatilization, and the evaporation or volatilization may be accelerated by using elevated temperatures or by using subatmospheric pressure or vacuum.

The coatings produced by the process of the invention are self-cleaning and water-repellant, and preferably have elevations, formed by the particles and, where appropriate, by the fine structure of the particles, whose average height is from 50 nm to 25 μm and whose average separation is not more than 25 μm, preferably whose average height is from 100 nm to 10 μm and/or whose average separation is not more than 10 μm, and very particularly preferably whose average height is from 100 nm to 4 μm and/or whose average separation is not more than 4 μm. The coatings produced by the process of the invention very particularly preferably have elevations whose average height is from 0.05 μm to 0.5 μm and whose average separation is not more than 0.5 μm. For the purposes of the present invention, the average separation is the separation of the highest elevation of an elevation from the most adjacent highest elevation. If an elevation has the shape of a cone, the tip of the cone is the highest elevation of the elevation. If the elevation is a rectangular parallelepiped, the uppermost surface of the rectangular parallelepiped is the highest elevation of the elevation. The average width of the elevations is preferably from 40 nm to 25 μm, preferably from 50 nm to 10 μm, and very particularly preferably from 0.05 to 0.5 μm. The average width of the elevations is measured at half of the height of the elevations, and averaged across the smallest and the largest width. The average width of a cone or of a cylinder is therefore the diameter of the cylinder or cone at half its height. The average width for a cube is the average derived from the length of the face plus the length of the face diagonals.

The coatings produced by the process of the invention preferably have a contact angle for water greater than 130°, preferably greater than 140°, particularly preferably greater than 145°.

The process of the invention may be used to produce articles which, on at least one surface, have a water- and dirt-repellant coating. The articles or the surfaces to be coated may be composed of a very wide variety of substances, e.g. metal, plastic, polymer, wood, ceramics, or glass.

The protective coating of the invention may be produced by the process of the invention for producing detachable, water- and dirt-repellant coatings on articles. This protective coating of the invention may be removed from the surface of the article by subjection to impact from a liquid with momentum greater than 12 mNs, for example by treatment with liquid droplets which impact the surface with momentum greater than 12 mNs. This value corresponds to the momentum of an average raindrop falling toward the earth at twice the velocity normally encountered in the natural world. The protective coatings of the invention may therefore be detached from the coated article by a simple method using a water jet. The protective coating can preferably be detached from the article by means of a water jet whose momentum is greater than 12 mNs and less than 60 mNs, preferably less than 30 mNs and greater than 15 mNs. No detergents are needed in the water in order to detach the protective coating.

The protective coating of the invention may be used to protect articles, e.g. machine tools or means of transport, e.g. ships, aircraft, cycles, or motor vehicles, e.g. cars, buses, trucks, or motorcycles, or products, from soiling during transport or in spaces used for sales or presentations. Other claimed applications are those for the protection of packaged products, i.e. products which comprise packaging material, for example for transport, and which have to be placed in intermediate storage outdoors where dirt can represent a risk.

The protective coating of the invention may moreover be used to protect articles, films or textiles from high levels of contamination by dirt and/or water during outdoor activities, during leisure or during work, in particular in the case of articles and textiles for ski sports, alpine sports, motor sports, motorcycle sports, motocross sports, and sailing sports. The protective coating of the invention may be used advantageously for technical textiles and fabrics used for textile buildings, selected from tents, awnings, umbrellas, tablecloths, cabriolet covers, and workwear.

Impregnating sprays may also comprise the suspension of the invention. The sprays may be used, for example, to provide detachable dirt- and water-repellant coatings for garden furniture, car wheel rims, car paints, showers, tiles, sanitary surfaces in general, laundries, and the like. An active ingredient preferably present in this impregnating spray is an inventive suspension of hydrophobic particles in a predominantly aqueous medium, as described above.

A description of the process of the invention, and also of their use, is given below, but without any intention that the invention be restricted thereto.

EXAMPLE 1

Preparation of Suspensions of the Invention

Aerosil® VP LE 8241 was suspended in ethanol in a Ultra-Turrax. Demineralized water was added to, and vigorously and thoroughly mixed with, the highly concentrated suspension of Aerosil® in ethanol, using an Ultra-Turrax. The suspension of the invention was then drawn off into spray bottles.

Table 1 shows the experimental parameters of Example 1.

TABLE 1

|  | Experiment number | | |
| --- | --- | --- | --- |
|  | 1 | 2 | 3 |
| Amount of demineralized water (in. % by weight) | 92 | 79 | 59 |
| Amount of ethanol (in % by weight) | 7 | 20 | 40 |
| Amount of Aerosil ® VP LE 8241 (in % by weight) | 1 | 1 | 1 |

EXAMPLE 2

Spray-Application of Suspension of the Invention to Surfaces

The suspensions of the invention were prepared as in Example 1 and applied, by means of a spray bottle, to the surface of the test specimens (polymethyl methacrylate (PMMA) plaques of thickness 2 mm), and the solvent or solvent mixture was then removed overnight by evaporation at room temperature. The surfaces were then first characterized visually, and recorded as +++ for all three of the suspensions. +++ means that there is almost complete formation of water droplets. The roll-off angle is below 10°.

What is claimed is:

1. A surfactant-free aqueous suspension, comprising water, hydrophobic nanostructured particles and an organic solvent;
   wherein the surfactant-free aqueous suspension is prepared by a process comprising:
   suspending the hydrophobic nanostructured particles in at least one organic solvent miscible with water and having a boiling point below 150° C. to form a concentrated organic suspension, and then
   mixing the concentrated organic suspension with surfactant-free water to form the surfactant-free aqueous suspension;
   wherein the surfactant-free aqueous suspension comprises at least 50.01% by weight of water;
   wherein the hydrophobic nanostructured particle has an average diameter of from 30 to 100 μm and is present in an amount of from 0.01 to 1% by weight based on the total weight of the surfactant-free aqueous suspension; and
   wherein the hydrophobic nanostructured particles are particles of polytetrafluoroethylene; and wherein the hydrophobic, nanostructured particles are not agglomerated.

2. The surfactant-free aqueous suspension as claimed in claim 1, comprising from 0.1 to 49.9% by weight of at least one alcohol, wherein the alcohol is miscible with water and has a boiling point below 150° C.

3. The surfactant-free aqueous suspension as claimed in claim 1, comprising at least 60% by weight water.

4. The surfactant-free aqueous suspension of claim 1, wherein the organic solvent is at least one of acetone and tetrahydrofuran.

5. The surfactant-free aqueous suspension as claimed in claim 1, wherein the organic solvent is at least one selected from the group consisting of methanol, ethanol, n-propanol and isopropanol.

6. The surfactant-free aqueous suspension as claimed in claim 1, wherein the hydrophobic, nanostructured particles have an irregular surface nanostructured comprising a fine structure with features of from 10 to 100 nm.

7. The surfactant-free aqueous suspension as claimed in claim 1, wherein the surfactant-free aqueous suspension consists of water, the hydrophobic nanostructured particles and the organic solvent.

8. The surfactant-free aqueous suspension as claimed in claim 1, wherein the hydrophobic nanostructured particles are particles of a cryogenically ground polytetrafluoroethylene.

9. A process for producing a detachable, dirt- and water-repellant coating on articles, where, during a coating process, hydrophobic particles are applied to the surface of the articles and thus a surface structured with elevations is produced on the surface of the articles, and has dirt- and water-repellant properties, comprising
   applying, to at least one surface, the surfactant-free aqueous suspension as claimed in claim 1, and then
   removing the water and the organic solvent.

10. The process as claimed in claim 9, wherein the application of the surfactant-free aqueous suspension to at least one surface of an article takes place by dipping the article into the surfactant-free aqueous suspension.

11. The process as claimed in claim 9, wherein the application of the surfactant-free aqueous suspension to at least one surface of an article takes place by spray-application of the surfactant-free aqueous suspension.

12. The process as claimed in claim 11, wherein a spray is used to apply the surfactant-free aqueous suspension.

13. The process of claim 9, further comprising:
    after removing the water and the organic solvent, removing the coating from the article by impact with a liquid having a momentum greater than 12 mNs.

14. The method as claimed in claim 13, wherein the liquid having a momentum of greater than 12 mNs does not contain a detergent.

* * * * *